Patented Sept. 15, 1931

1,823,495

UNITED STATES PATENT OFFICE

CARL KRAUCH AND MARTIN MÜLLER-CUNRADI, OF LUDWIGSHAFEN-ON-THE-RHINE, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

PRODUCTION OF HYDROCARBONS OF HIGH MOLECULAR WEIGHT

No Drawing. Application filed June 1, 1927, Serial No. 195,858, and in Germany June 5, 1926.

We have found that hydrocarbons of high molecular weight and in particular products of the nature of caoutchouc can be produced by polymerizing the products consisting substantially of compounds containing at least two double bonds on the molecule resulting from the destructive hydrogenation of carbonaceous materials, if necessary after a preliminary dehydrogenation or splitting or cracking treatment or both, which leads to unsaturated compounds. The product to be polymerized should preferably contain conjugated double bonds. Destructive hydrogenation when referred to herein means the treatment under pressure of mineral oils, coals or other carbonaceous substances, tars and their extraction-, distillation-, and conversion-products with hydrogen or gases giving off hydrogen, the initial materials being both hydrogenated and at the same time suffering other changes in the molecule.

The most various products of the destructive hydrogenation can be used as initial substances, and these products especially when they are unsaturated and have a low boiling point, may be either directly polymerized, or they may be, especially when they contain large amounts of compounds of a saturated nature, as for instance butanes, pentanes, hexanes etc., or hydroaromatic hydrocarbons such as cyclopentane, cyclohexane and their homologues, subjected, prior to polymerization, to a dehydrogenation or splitting or cracking treatment. Whether the preliminary treatment is necessary or not can as a rule be ascertained by shaking the destructive hydrogenation product with concentrated sulphuric acid. If the product contains a sufficient amount of hydrocarbons with several double bonds in the molecule the color of the mixture becomes substantially darkened.

If this is not the case, the desired unsaturated substances can be produced in different ways, for instance, by thermal or electric treatment, or by the action of chemically active rays, and if necessary in the presence of dehydrogenating or other suitable catalysts. As examples of catalysts suitable for a thermal treatment which may be carried out in any known or suitable manner substances of large superficial area, such as for instance active carbon, if desired in combination with other substances, or metals, the oxids of which are readily reducible such as iron in a fine state of division may be mentioned; in some cases it may be advantageous to reduce the efficiency of highly active catalysts by a suitable treatment, for instance by heating to high temperatures or by the addition of inert materials to the catalysts or by dilution of the products to be treated, as otherwise too fargoing splitting of the molecules would occur. Other suitable catalysts are for example compounds of elements occurring in several stages of oxidation, such as chromium, tungsten, uranium and the like. Mixtures or compounds of several elements or their compounds, either of the aforementioned or other ones, may also be employed. A very suitable catalyst of this kind is for example lead chromate. The dehydrogenation may also be carried out in stages, for instance by first splitting off only one molecule of hydrogen, and then, either in the same manner or under other conditions, again splitting off hydrogen. When working with catalysts, different catalysts may be employed for the various stages. The dehydrogenation may be carried out in the presence of gases or vapors, for instance in the presence of nitrogen, carbon dioxid, oxygen, water vapor and may be effected under any desired pressure, either atmospheric or elevated, or more preferably diminished pressure.

The removal of hydrogen may also be effected in other ways. For instance halogen may be introduced once or repeatedly, into the molecules of the saturated hydrocarbons and thereupon hydrogen halide split off. In this reaction the conditions of working may be chosen as desired, for example pentane or another hydrocarbon may be chlorinated by treatment with chlorine and chemically active rays and the said method of working may also be combined with a catalytic dehydrogenation. For example, pentane can be converted into an amylene by catalytic treatment with one of the aforesaid dehydrogenating catalysts, and the amylene then converted by treatment with chlorine in vacuo into amylene chlorid, from the bulk of which hydrochloric acid is at once split off so that chiefly chloro-amylene is obtained.

The unsaturated compounds may also be obtained, instead of by dehydrogenation, by splitting off hydrocarbon radicals, for example by heating hydroaromatic hydrocarbons to about red heat, in which reaction catalysts such as quartz or platinum may also be employed. A dehydrogenation may be combined with such splitting off of hydrocarbon radicals; or it may in a separate operation precede or follow the splitting or cracking treatment. The treatment for splitting off hydrocarbon radicals may also be combined with the halogen treatment in the manner described.

The unsaturated hydrocarbons obtained, which should preferably contain several double bonds, may either be isolated from the reaction mixtures obtained in their production for the further treatment or first subjected to a rearrangement, which reaction is also preferably carried out with the aid of catalysts; for example it may be effected by passing them at about 400° C. over precipitated alumina.

The unsaturated products whether isolated or present in a dilute state may be treated in any known or suitable manner in order to effect polymerization. For instance they may be subjected to the action of moderate heat, if necessary, for a considerable length of time. For example isoprene obtained from a destructive hydrogenation product, for example as described in Example 2 may be heated for a long time, say 100 days under pressure, in the presence of some oxygen, to about 60° while stirring or shaking, or they may be polymerized in the presence of other substances, for instance of metallic sodium, carbon dioxid and the like.

The following examples will further illustrate how our invention may be carried out in practice but the invention is not limited to these examples.

*Example 1*

A fraction of a product of the destructive hydrogenation of mineral oil, boiling up to about 100° C., which contains hydrocarbons with several double bonds in the molecule (this can as a rule, be recognized by the fact that on shaking with concentrated sulphuric acid the color of the mixture becomes considerably darkened), and which is obtained by fractional distillation is treated at room temperature for several hours with an excess of aqueous sulphurous acid while vigorously stirring or shaking. The solid products settling after that time are separated and, if necessary, washed. When these products are heated, or treated with aqueous solutions of alkalis, hydrocarbons are obtained which can be converted into substances of high molecular weight, of the nature of caoutchouc, by treating the same with suitable polymerizing agents, such as for instance metallic sodium in a finely divided state.

*Example 2*

A fraction boiling at about from 30 to 40° C. obtained by fractional distillation of a product of the destructive hydrogenation of coal, is passed at about 500° C. over precipitated chromium oxid, whereby dehydrogenation takes place. By treatment of the product thus obtained at room temperature with an excess of aqueous hydrochloric acid while agitating and thereupon distilling, ample amounts of an amyl chlorid are produced, which on being passed under reduced pressure over barium chlorid at about 400° C. gives tri-methyl-ethylene. This is then converted by treatment with chlorine in vacuo whereby simultaneously one molecule of hydrogen chlorid is split off chiefly into chloro-amylene, and then by again splitting off hydrogen chlorid into isoprene which by treatment with stannic chlorid in the cold produces a polymerization product of resinous nature.

*Example 3*

A fraction consisting mainly of hydroaromatic hydrocarbons and boiling between 65 and 75° C. obtained by fractional distillation of a product of the destructive hydrogenation of coal is split or cracked by catalytic treatment at about red heat in the presence of quartz or platinum, whereby a product is obtained, which contains abundant quantities of butadiene. The butadiene, separated by distillation, is polymerized by the action of 1 per cent of metallic sodium in a fine state of division, in the course of about 4 weeks, to products of the nature of caoutchouc.

What we claim is:

1. The process of producing hydrocarbons of high molecular weight, which comprises destructively hydrogenating carbonaceous materials and polymerizing such of the hydrocarbon products of said reaction consisting substantially of compounds containing at least 4 atoms of carbon in the molecule as give a dark coloured mixture when shaken with concentrated sulphuric acid.

2. The process of producing hydrocarbons of high molecular weight, which comprises destructively hydrogenating carbonaceous materials and polymerizing such of the hydrocarbon products of said reaction as consist substantially of compounds containing at least 4 carbon atoms and conjugated double bonds in the molecule.

3. The process of producing hydrocarbons of high molecular weight, which comprises destructively hydrogenating carbonaceous materials, converting the hydrocarbon products of said reaction containing at least 4 atoms of carbon in the molecule into such unsaturated hydrocarbon products as give a dark coloured mixture when shaken with concentrated sulphuric acid and polymerizing the latter.

4. The process of producing hydrocarbons of high molecular weight, which comprises destructively hydrogenating carbonaceous materials, dehydrogenating the hydrocarbon products of said reaction containing at least 4 atoms of carbon in the molecule into such unsaturated hydrocarbon products as give a dark coloured mixture when shaken with concentrated sulphuric acid and polymerizing the latter.

5. The process of producing hydrocarbons of high molecular weight, which comprises destructively hydrogenating carbonaceous materials, dehydrogenating the hydrocarbon products of said reaction containing at least 4 atoms of carbon in the molecule in several stages into such unsaturated hydrocarbon products as give a dark coloured mixture when shaken with concentrated sulphuric acid and polymerizing the latter.

6. The process of producing hydrocarbons of high molecular weight, which comprises destructively hydrogenating carbonaceous materials, treating such of the producs consisting substantially of compounds containing at least 4 atoms of carbon in the molecule with a dehydrogenating catalyst comprising a compound of a metal occurring in several stages of oxidation, treating the product thus obtained with aqueous hydrochloric acid, passing the product thus obtained over barium chloride, treating the product with chlorine, splitting off hydrogen chloride and polymerizing the resulting hydrocarbon product by treatment with sodium.

In testimony whereof we have hereunto set our hands.

CARL KRAUCH.
MARTIN MÜLLER-CUNRADI.